United States Patent
Gates et al.

(10) Patent No.: US 11,214,740 B2
(45) Date of Patent: Jan. 4, 2022

(54) ENDOGENOUS ASPHALTENIC ENCAPSULATION OF BITUMINOUS MATERIALS WITH RECOVERY OF LIGHT ENDS

(71) Applicant: Solideum Holdings Inc., Calgary (CA)

(72) Inventors: Ian Donald Gates, Calgary (CA); Jingyi Wang, Calgary (CA)

( * ) Notice: Subject to any disclaimer, the term of this patent is extended or adjusted under 35 U.S.C. 154(b) by 89 days.

(21) Appl. No.: 16/493,085

(22) PCT Filed: Mar. 9, 2018

(86) PCT No.: PCT/CA2018/050287
§ 371 (c)(1),
(2) Date: Sep. 11, 2019

(87) PCT Pub. No.: WO2018/165745
PCT Pub. Date: Sep. 20, 2018

(65) Prior Publication Data
US 2021/0139785 A1    May 13, 2021

Related U.S. Application Data

(60) Provisional application No. 62/471,218, filed on Mar. 14, 2017, provisional application No. 62/525,699, filed on Jun. 27, 2017.

(51) Int. Cl.
| | | |
|---|---|---|
| *C10C 3/00* | (2006.01) | |
| *C10C 3/14* | (2006.01) | |
| *C10C 3/18* | (2006.01) | |
| *C08L 95/00* | (2006.01) | |
| *C10G 1/04* | (2006.01) | |

(52) U.S. Cl.
CPC ............... *C10C 3/00* (2013.01); *C08L 95/00* (2013.01); *C10G 1/045* (2013.01); *C10G 2300/206* (2013.01)

(58) Field of Classification Search
CPC .. C10C 3/00; C10C 3/002; C10C 3/14; C10C 3/18
See application file for complete search history.

(56) References Cited

U.S. PATENT DOCUMENTS

| | | |
|---|---|---|
| 3,026,568 A | 3/1962 | Moar |
| 3,660,269 A | 5/1972 | Mccauley |
| 4,769,288 A | 9/1988 | Saylak |
| 5,637,350 A | 6/1997 | Ross |
| 6,357,526 B1 | 3/2002 | Abdel-Halim |
| 8,841,365 B2 | 9/2014 | Marzouki et al. |
| 2010/0056669 A1 | 3/2010 | Bailey |
| 2011/0185631 A1* | 8/2011 | Subramanian ............. B01J 2/06 44/593 |
| 2011/0233105 A1 | 9/2011 | Bailey |
| 2013/0075306 A1 | 3/2013 | Milani et al. |
| 2017/0002275 A1 | 1/2017 | Gupta |
| 2017/0114281 A1 | 4/2017 | Gupta et al. |
| 2019/0209989 A1* | 7/2019 | Schroeder ................. B29B 9/10 |
| 2020/0407645 A1* | 12/2020 | Gates ................... B29C 43/222 |

FOREIGN PATENT DOCUMENTS

| | | | |
|---|---|---|---|
| CA | 2958443 A1 | 4/2017 | |
| DE | 102013226373 A1 | 6/2015 | |
| WO | 2011/074985 A1 | 6/2011 | |
| WO | 2015/104518 A1 | 7/2015 | |
| WO | 2016/110747 A1 | 7/2016 | |
| WO | WO-2016110747 A1 * | 7/2016 | ............... B01J 2/26 |
| WO | 2016/134476 A1 | 9/2016 | |
| WO | 2018/046837 A1 | 3/2018 | |

OTHER PUBLICATIONS

1st Office Action for Chinese Patent Application No. 201880017481. 3, dated Nov. 13, 2020 in the corresponding Chinese application (English Summary).
International Search Report & Written Opinion issued in PCT/CA2018/050287, dated May 31, 2018.
Yang and Czarnecki, 2005, Energy & Fuels 19, No. 6: 2455-2459.
EESR issued Dec. 23, 2020 in the corresponding European application.

* cited by examiner

*Primary Examiner* — Randy Boyer
(74) *Attorney, Agent, or Firm* — Verrill Dana, LLP; Robert L. Hover

(57) ABSTRACT

The invention provides methods for pelletizing bituminous liquids by inducing endogenous asphaltenes in the liquid to form a resilient external membrane on an aliquot of the bituminous liquid, optionally with simultaneous collection of light components that result from the process of inducing endogenous asphaltene formation.

23 Claims, 9 Drawing Sheets

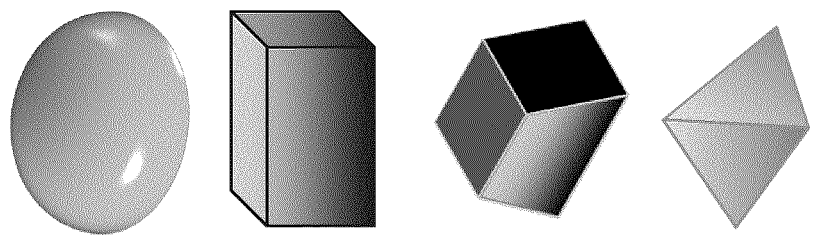
FIG. 5
Cross-section View
Semi-circular Pattern = Hemispherical Pellets 
Rectangular Pattern = Box Pellets 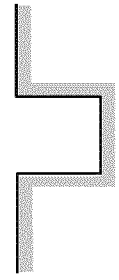
Truncated Pyramid Pattern = Truncated Pyramid Pellets 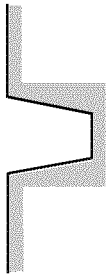
Pyramid Pattern = Pyramid Pellets 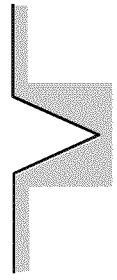
Pattern with Beveled Edge = Box Pellets with Top Seal 
Top View
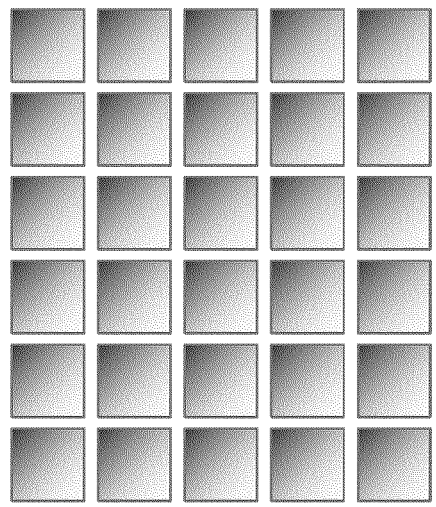

FIG. 7

| Material | State and Property (22 degrees C) |
|---|---|
| Original Bitumen | Liquid, 18wt.% asphaltene, 1 million cP |
| Pellet Skin | Solid, 35wt.% asphaltene, 0.1 GPa |
| Bitumen within Pellet (after extraction from pellet) | Liquid, 18wt.% asphaltene, 1 million cP |

Drainage of heated bitumen from opened pellet

Rounded cap pellet

Dimensions of Pellet = 8 cm (length) and 6 cm (diameter)

Thickness of outer coating after process = <1 mm

ENDOGENOUS ASPHALTENIC ENCAPSULATION OF BITUMINOUS MATERIALS WITH RECOVERY OF LIGHT ENDS

FIELD OF THE INVENTION

The invention is in the field of methods for shaping materials, in particular by physically and chemically treating viscous bituminous liquids to form discrete solid-encapsulated shapes, optionally with associated recovery of light ends as a separate product stream.

BACKGROUND OF THE INVENTION

It is common practice to segregate petroleum substances of high viscosity and density into two categories, "heavy oil" and "bitumen". For example, some sources define "heavy oil" as a petroleum that has a mass density of between about 920 kg/m$^3$ (or an API gravity of about 26°) and 1,000 kg/m$^3$ (or an API gravity of about 10°). Bitumen is sometimes described as that portion of petroleum that exists in the semi-solid or solid phase in natural deposits, with a mass density greater than about 1,000 kg/m$^3$ (or an API gravity of about 10°) and a viscosity greater than 10,000 centipoise (cP or 10 Pa·s) measured at original temperature in the deposit and atmospheric pressure, on a gas-free basis. Although these terms are in common use, references to heavy oil and bitumen represent categories of convenience, and there is a continuum of properties between heavy oil and bitumen. Accordingly, references to heavy oil and/or bitumen herein include the continuum of such substances, and do not imply the existence of some fixed and universally recognized boundary between the two substances. In particular, the term "heavy oil" includes within its scope all "bitumen" including hydrocarbons that are present in semi-solid or solid form. Similarly, a "bituminous" material is one that includes a bitumen component, as that component is broadly defined.

Bituminous liquids generally include an asphaltene component. Asphaltenes may for example be suspended as a nanocolloid or otherwise dispersed within a bituminous liquid. Asphaltenes may be defined practically by differential solubility, for example as the component of a bituminous material that is insoluble in n-alkanes, such as n-pentane or n-heptane, and soluble in toluene or benzene. In molecular terms, asphaltenes are generally present as a complex mixture that includes high molecular weight polyaromatic carbon ring units, with oxygen, nitrogen, and sulfur heteroatoms, as well as alkane chains and cyclic alkanes. As used herein, the term "asphaltenes" encompasses this wide range of variously defined materials, and an "asphaltenic" material is one that includes an asphaltene component, as that component is broadly defined.

The presence of asphaltenes in bitumen has in some circumstances been suggested to represent a potential production or transportation problem. During production, for example, asphaltene precipitation and deposition are recognized risks that may result from changes in pressure, temperature, chemical composition and shear rate. In contrast, in some bitumens, relatively high asphaltene concentrations appear to be present as a stable viscoelastic network (Yang and Czarnecki, 2005, Energy & Fuels 19, no. 6: 2455-2459). In the context of transportation, methods have for example been described for removing asphaltenes from bitumen prior to transport (see for example US Patent Publication 20170002275). For these and other reasons, a wide range of processes are known for removing asphaltenes from petroleum liquids, for example in de-asphalter units in crude oil refineries or bitumen upgraders, such as solvent de-asphalter units that separate the asphaltenes by virtue of the fact that light hydrocarbons, such as propane, butane or pentane, will dissolve aliphatic compounds but not asphaltenes.

Heavy oils and bitumen can be separated into not only viscous components such as asphaltenes but also lighter materials. These light ends are composed of saturate (alkane) and aromatic components and typically have viscosities lower than that of the asphaltenic component. Upon heating of heavy oil or bitumen, reactions occur that can break bonds in the heavy components of the heavy oil and bitumen leading to the generation of lighter materials such as saturate and aromatic components. These components, when mixed with the original heavy oil and bitumen, can lead to an upgraded oil product.

The foregoing characteristics of heavy oils and bitumen give rise to a variety of risks and challenges associated with transportation, handling and storage, in liquid form or otherwise. There is accordingly an ongoing need for improved techniques for transporting and handling heavy oil and bitumen. Furthermore, if the heavy oil or bitumen is processed for transportation which generates lighter components from the reactions done to prepare the heavy oil or bitumen for transport, then these light components can be collected and sold as a product stream or collected and remixed with the original heavy oil and bitumen to yield the original oil product or a partially upgraded oil product.

SUMMARY

In one aspect of the invention, processes are provided that take advantage of the recognition that endogenous asphaltenes in a bituminous liquid may be induced to coalesce on the surface of an aliquot of the bituminous liquid, so as to form a resilient membrane that has sufficient structural integrity to retain the remaining bituminous liquid in the form of a discrete shape. In effect, endogenous asphaltenes in the bituminous liquid are converted into a resilient solidified surface layer on shaped units of the bituminous liquid. These pellets or capsules of bitumen are then amenable to material handling techniques adapted for particulate solids. During these processes to form endogenous asphaltenes on the surface of an aliquot of the bituminous liquid, light components may be generated from reactions that occur at the surface of the bituminous liquid. These light components are generally composed of relatively low molecular weight alkanes (linear hydrocarbons up to C20 alkanes and potentially above) and aromatics (cyclic hydrocarbons up to C20 aromatics and potentially above). These light components can be collected as a separate liquid product stream.

Methods are accordingly provided for segregating a bituminous liquid into discrete shaped units. In a continuous process, generally applied to heated bitumen, the bituminous liquid may be divided into shaped liquid aliquots, each aliquot having a discrete shape defined by a material handing mechanism that contains the aliquot. For example, in a process analogous to gravure printing, a rotating cylinder may be shaped with indentations, and the surface of the cylinder flooded with bituminous liquid. The cylinder may then be wiped with a doctor blade, so that separate aliquots of the bituminous liquid remain within each of the recessed indentations. The exterior surface of each shaped aliquot may then be treated, for example by heating of the rotating cylinder, so that the indented gravure cylinder acts as a heated coating roll, with the heat forming an outer membrane of asphaltenic material from the shaped bituminous liquid. In this way, each shaped aliquot is encapsulated within a resilient asphaltenic coating. The outer asphaltenic layer is sufficiently resilient to retain the discrete shape of the shaped aliquot when the aliquot is released from the material handling mechanism. In a process again analogous to the transfer of ink in gravure printing, the shaped aliquots may for example be released from the patterned rotating cylinder onto a substrate, for example after being nipped between a second heated backing roll and the heated patterned gravure roll. The shaped aliquots released onto the substrate form resiliently shaped units of bituminous liquid encapsulated in the asphaltenic outer membrane, which may for example be cooled on the substrate, and then released from the substrate, for example with a scraper, producing pellets of bituminous liquid. During the process analogous to gravure printing, the light components generated during the step of forming the shaped bituminous liquid can be collected into a separate liquid product stream.

In alternative aspects, the density of the units of bituminous liquid produced by processes of the invention may be adjusted, for example by incorporating agents within the pellets such as gas bubbles, catalysts, or solvents. In some embodiments, pellets can accordingly be designed to be buoyant in water, which may for example facilitate recovery of the pelleted material in the event of an environmental release or spill.

In other alternative aspects, the light component stream may be collected and sold as an individual product or can be mixed at a later time with the units of bituminous liquid to form a mixture similar to the original heavy oil or bitumen or a partially upgraded oil.

BRIEF DESCRIPTION OF THE DRAWINGS

FIG. 5 is a diagram illustrating different pellet shapes obtained from a patterned roll to convert heavy oil or bitumen to a pelletized form.

FIG. 7 is a table listing properties of original bitumen, the skin encapsulating spherical pellets and the bitumen or heavy oil product after extraction from an encapsulated pellet.

DETAILED DESCRIPTION OF THE INVENTION

Methods are provided to pelletize a wide variety of heavy oils and bitumen, including for example residual oil fractions from upgrading and refining plants with simultaneous collection of lighter components into a separate product stream. In some implementations, continuous high speed methods are provided, as illustrated in FIGS. 1-6. Units or pellets of bituminous material may be produced of widely variable size and density.

In select methods, a heated gravure patterned roll apparatus is employed within a controlled material handling environment, to convert a heavy oil or bitumen stream into separate small units of specific shape. The patterned roll may be used to apply heat to the exterior of the pellets. The output from the gravure roll apparatus may be a pelletized form of heavy oil or bitumen that has a relatively thin semi-solid or solid coating on the surface that is sufficiently resilient to contain a liquid heavy oil or bitumen within the pellet and lighter components into a separate product stream. In alternative embodiments, the patterned roll may be shaped so as to provide pellets of widely variable shape, such as spheres, ellipsoids, cubes, pyramids, double pyramids, or other shapes. FIG. 5 displays example patterns that can be used to form the bitumen pellets. In select embodiments, the dimensions of the pellets can for example range from millimeters to tens of centimeters, with some preferred size embodiments being on the order of a few centimeters.

Figure 1:
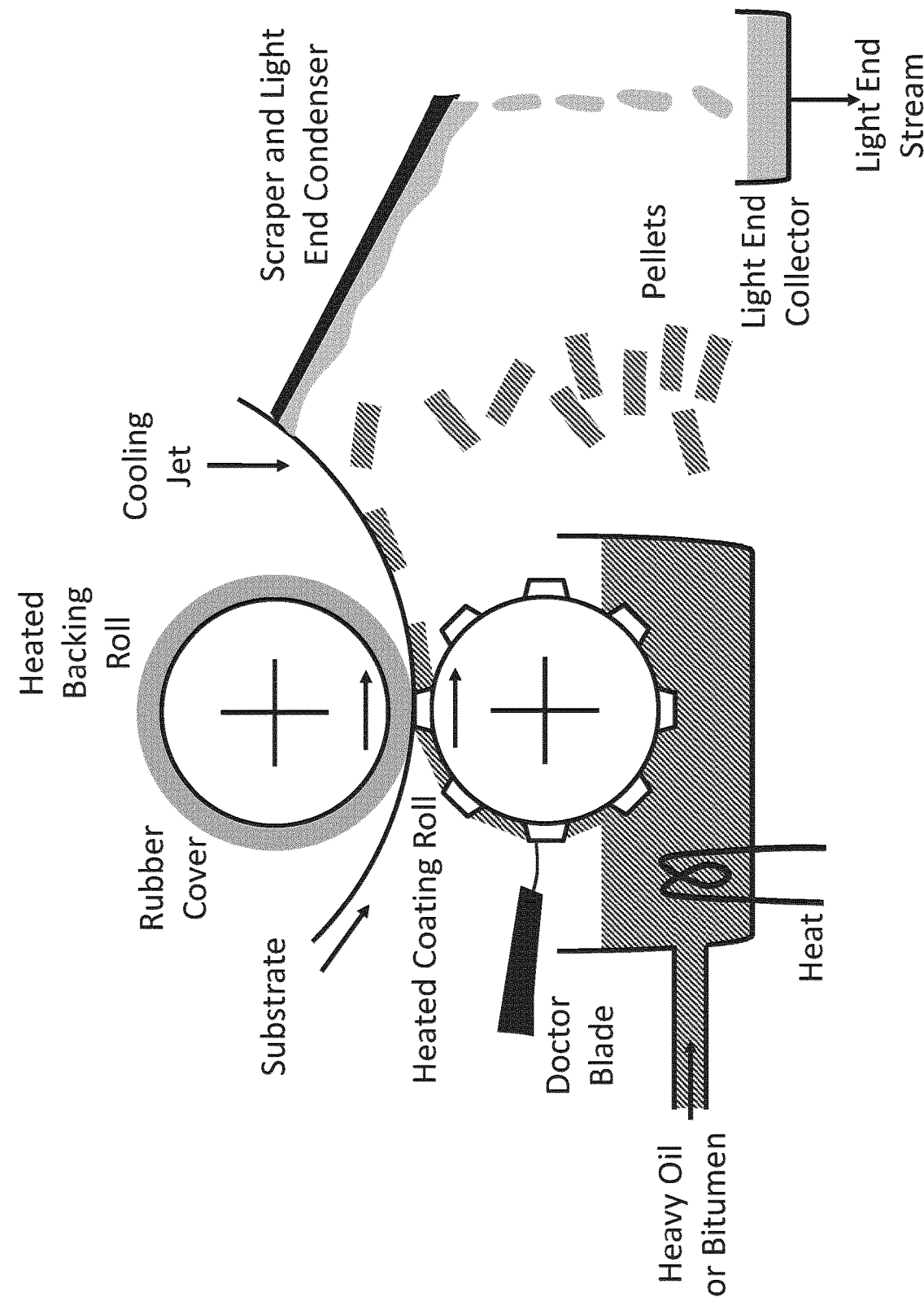
FIG. 1 is a diagram exemplifying one implementation of the methods described herein for treating a heavy oil or bitumen to a pelletized form and recover the light components formed during the process.

FIG. 1 illustrates an implementation of the present methods for treating a heavy oil or bitumen with simultaneous collection of lighter components into a separate product stream. In this method, the bitumen is heated and flows into a tank. The heating is carried out so that the viscosity of the heavy oil or bitumen drops to facilitate processing with the patterned roll apparatus. In select embodiments, the temperature range for this heating may for example be between about 150° C. and 250° C. In select embodiments, at this stage, the temperature may be constrained to under about 250° C., to minimize reactions from occurring in the heavy oil or bitumen. The heat can for example be delivered through a variety of methods, including heat tracing tape, steam heating, and electrical heating. The light components can be collected by using a cool surface or a standard condensation coil.

As illustrated in FIG. 1, a patterned roll dips into the tank and the patterns in the roll are filled with hot bitumen. The heated patterned roll may for example be maintained at between about 300° C. and 500° C., most preferably between 350° C. and 450° C.

The surface of the patterned roll may for example be constructed of a oleicophobic material. The bitumen in the recessed patterns on the roll may then be deposited on a oleicophobic substrate, which as illustrated is heated by a backing roll. The bitumen patterns on the substrate are then cooled and scraped off the substrate for subsequent transport or processing. The mechanism may be adapted so that reactions on the outer surface of the bitumen pellet occur in the nib, the contact region between the rolls, to form the exterior coating on the pellet. The rolls can for example be loaded, so that there exists a positive pressure in the nib. In this way, the heat and pressure of patterned roll and nib cause reactions that lead to the formation of a thin solid layer on the surface of the bitumen pellet. For example, thermal cracking (pyrolysis) reactions may occur which produce a viscous coating on the surface of the pellets, and asphaltene precipitation may also occur in a way which helps to strengthen the coating on the surface of the pellet.

The controlled material handling environment may for example include mechanisms for applying additional surface treatments to the pellets, for example by treating the exterior of the pellets with chemical agents and/or ultrasonic stimulation. These additional surface treatments may for example be applied so as to improve a desired quality of the outer coating. For example, aliquots of bituminous liquid may be exposed to chemical agents such as $CO_2$, propane, pentane or heptane. In addition, physical treatments in addition to heating may be applied, such as ultrasound. To form the coating on the outside of the heavy oil or bitumen pellets, the chemical changes that occur on the outside of the heavy oil or bitumen pellet may for example include asphaltene precipitation and thermal cracking (pyrolysis-splitting larger hydrocarbon chains into smaller-chained compounds). In particular, in the nib of the patterned roll system, a solvent may be introduced to increase the formation of asphaltene on the surface of the pellets.

At the downstream side of the unit, the light components are collected by using a condenser. The liquid condensate is collected and removed as a product stream. The condenser can take any form including a chilled plate or a standard condenser coil.

Figure 2:
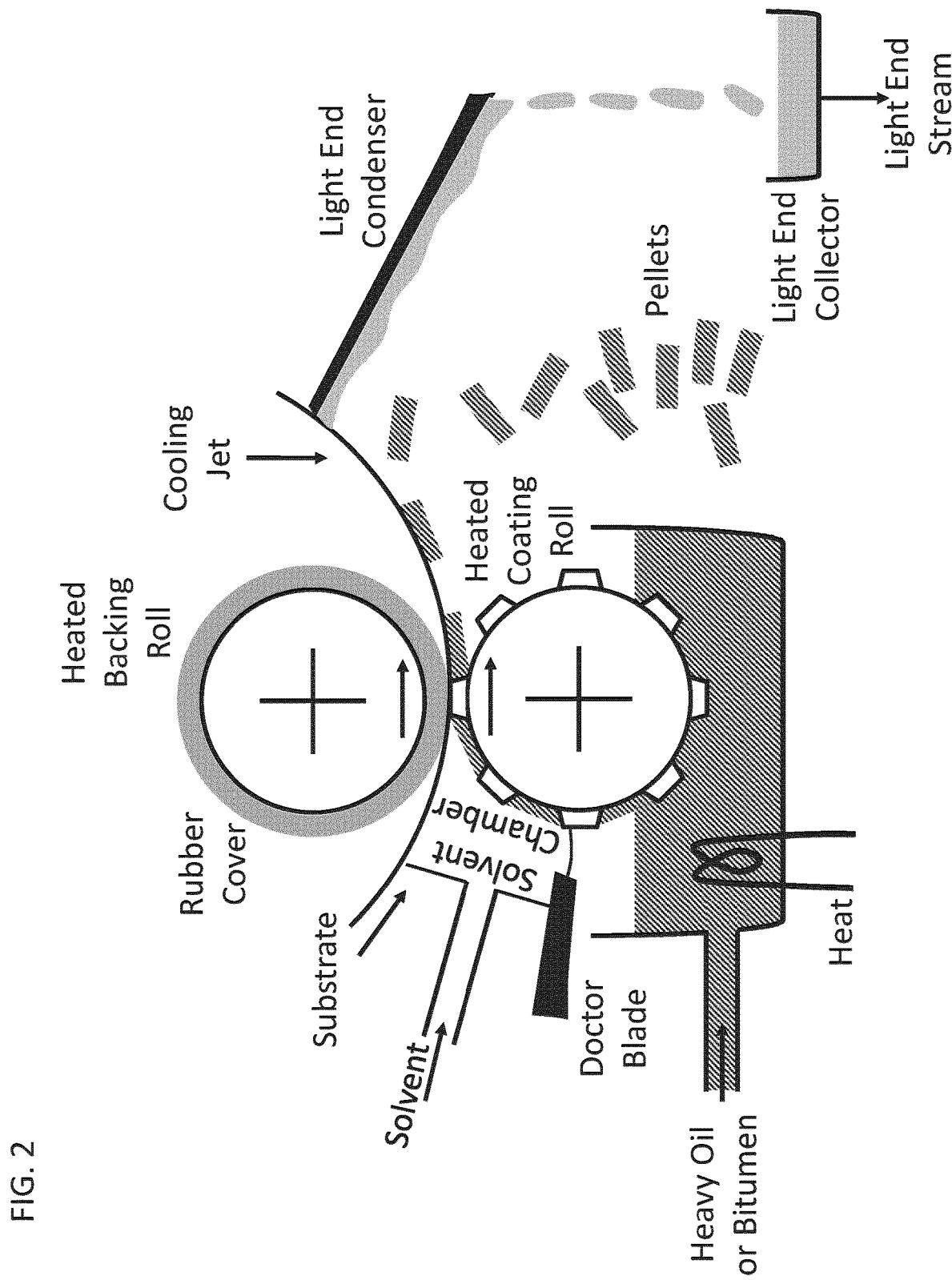
FIG. 2 is a diagram exemplifying another implementation of the methods described herein for treating a heavy oil or bitumen to a pelletized form and recover the light components formed during the process.

FIG. 2 illustrates an exemplary embodiment in which a solvent zone is placed just up-stream of the nib with simultaneous collection of lighter components into a separate product stream. Process conditions may be selected in such an embodiment so as to cause further asphaltene precipitation from the bitumen at the surfaces of the bitumen pellets. Alternative solvents include propane, pentane, and heptane.

Figure 3:
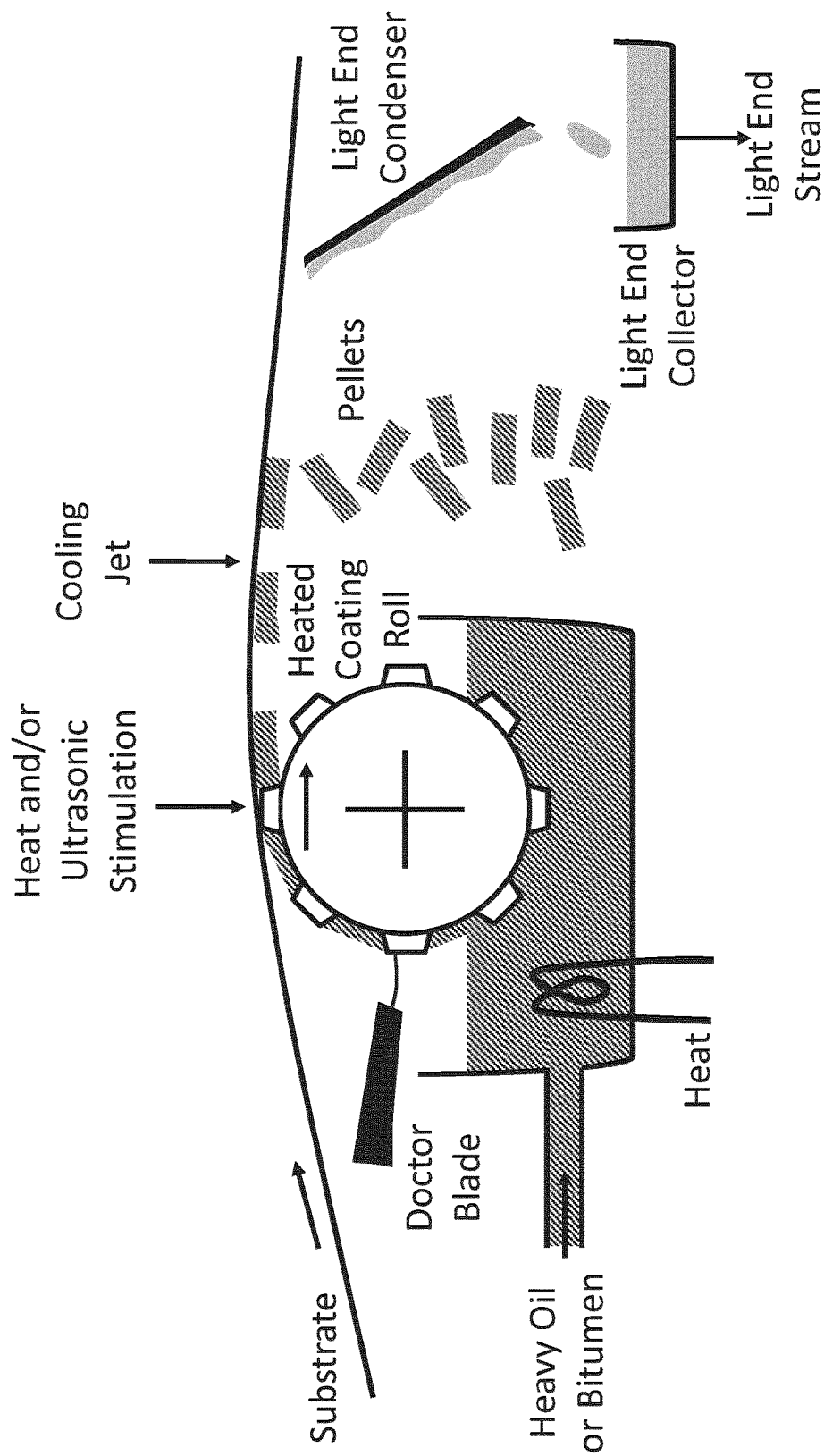
FIG. 3 is a diagram exemplifying another implementation of the methods described herein for treating a heavy oil or bitumen to a pelletized form and recover the light components formed during the process.

FIG. 3 shows another exemplary embodiment, in which ultrasonic stimulation is used in the nib with simultaneous collection of lighter components into a separate product stream. Process conditions may be selected in such an embodiment so as to further cause the precipitation of asphaltenes on the outer surface of the bitumen pellet, as the aliquot of bituminous liquid is retained in the pattern. Ultrasonic stimulation may for example be carried out so as to cause sonochemical reactions to occur, for example reactions that lead to viscosification of the bitumen. In select embodiments, the frequency of operation of the ultrasonic stimulation may for example be between about 20 and 40 kHz.

Figure 4:
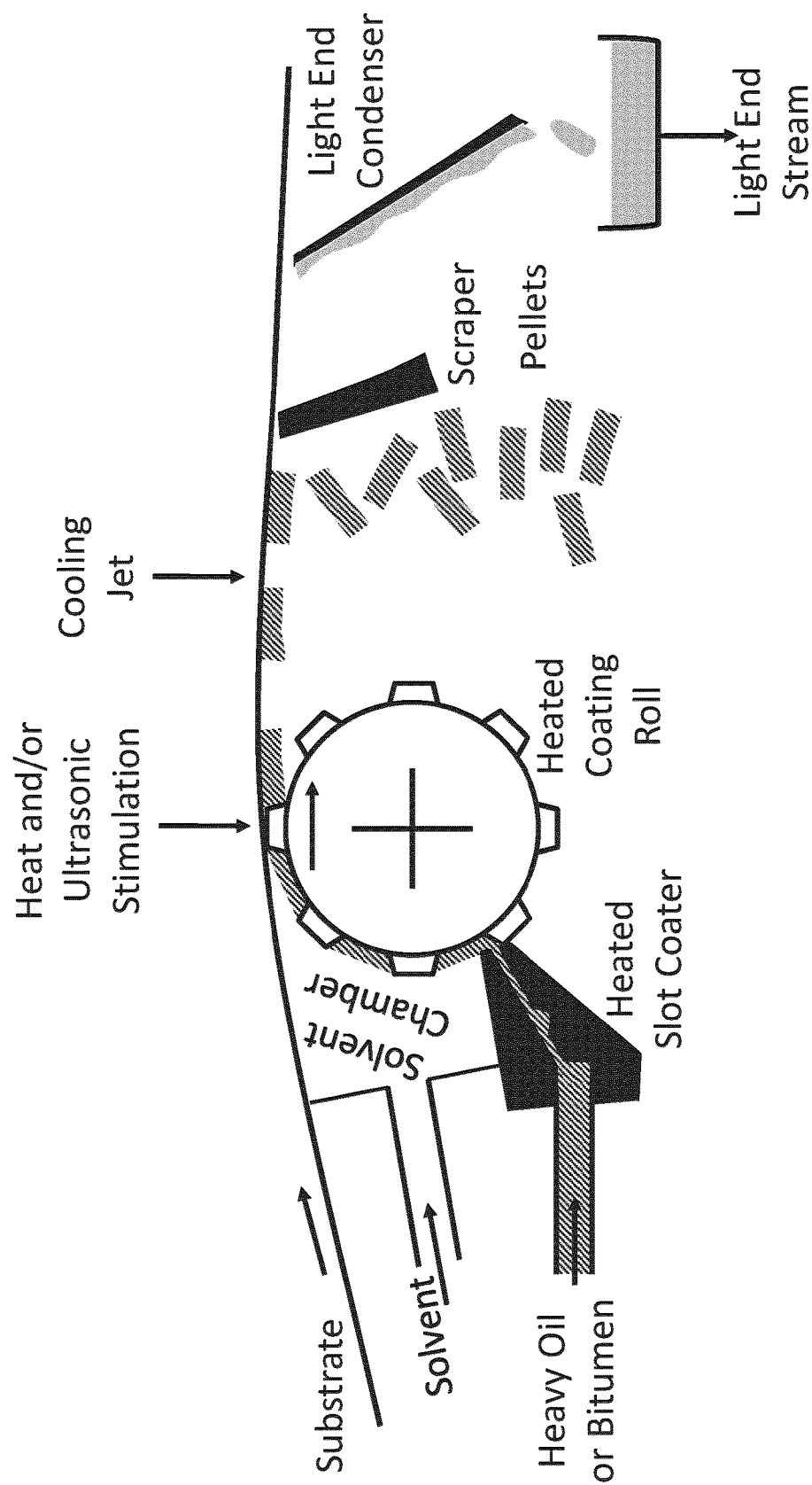
FIG. 4 is a diagram exemplifying another implementation of the methods described herein for treating a heavy oil or bitumen to a pelletized form and recover the light components formed during the process.

FIG. 4 illustrates an embodiment in which heat, solvent, and ultrasonic stimulation are all used to form the skin on the surface of the bitumen pellet with simultaneous collection of lighter components into a separate product stream. In further alternatives, other fluid distribution systems can be used, such as a slot coater, to place the bitumen on the patterned roll.

As illustrated in FIGS. 1-4, in select embodiments, downstream of the pattern roll apparatus, the pellets may be cooled, for example to ambient or chilled conditions. In this way, after the pellets emerge from the nib, the pellets are cooled so as to facilitate separation of the pellets from the backing web (substrate). Chilling is also contemplated, to collect lighter components into a separate product stream.

In some embodiments, prior to the patterned roll apparatus, the heavy oil or bitumen may be mixed with other materials to yield a pellet with other functional capabilities. For example, the oil can be partially foamed so that it has a gas within the liquid which alters the overall density of the oil yielding pellets that float on water. For example, as illustrated in FIG. 1, the bitumen can be foamed before it enters the tank so that it forms a foamed bitumen pellet. The gas used to create the foam can for example be nitrogen or carbon dioxide. The amount of gas in the pellets can be controlled to control the overall density of the bitumen pellets. In another implementation of the method, encapsulated solvent can be added to the heavy oil or bitumen yielding a pellet that contains solvent which when the pellet is processed can be used as part of the product. Similarly, in a further alternative implementation, one or more catalysts can be distributed within the heavy oil or bitumen pellets, for example to facilitate future processing of the bituminous liquid.

In alternative embodiments, the processing time and conditions in the patterned roll apparatus can be altered to provide a thicker coating on the pellets. In this manner, the overall chemical composition of the pellet can be tuned to a specific need. For example, the asphaltene content can be raised so that the pellets are more amenable for asphalt processing for road construction.

Figure 6:
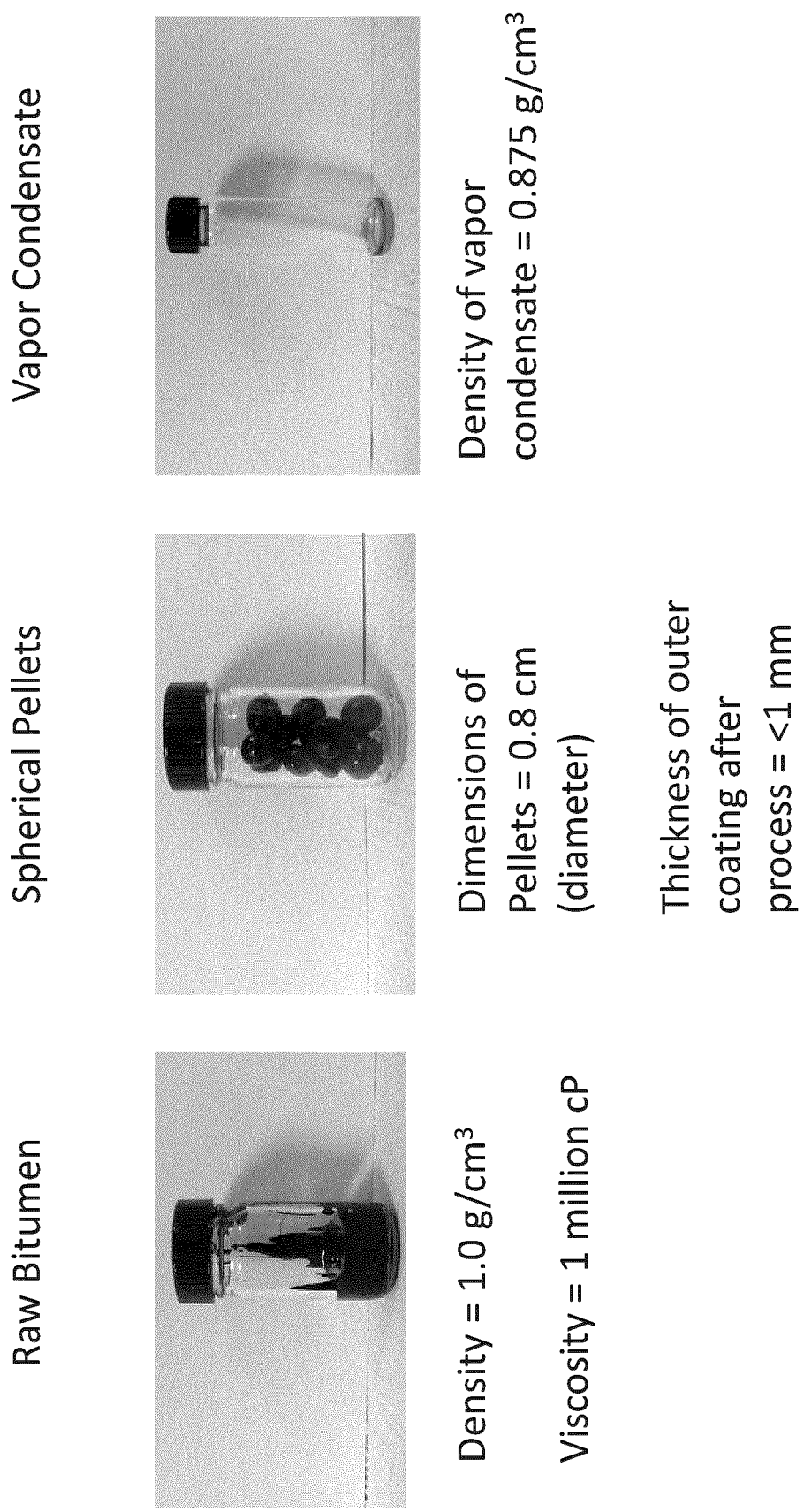
FIG. 6 includes three photographic images, illustrating characteristics of raw bitumen, spherical pellets and a vapor condensate.

FIG. 6 shows an example of bitumen pellets created by using one of the methods described herein. The first image of FIG. 6 displays the raw bitumen. The second image of FIG. 6 displays the bitumen pellets. The thickness of the skin is less than 1 mm. The third image of FIG. 6 shows the liquid condensate formed from the process. The density of the liquid condensate is equal to 0.875 g/cm3.

FIG. 7 sets out data from analysis of the interior bitumen and external skin of an exemplary bitumen pellet. The original bitumen is a liquid with viscosity of about 1 million cP. After the process, the outer skin is a solid and has a Young's modulus equal to 0.1 GPa. The asphaltene content of the original bitumen and skin are 18 and 35 weight percent, respectively. The encapsulated bitumen within the pellet has essentially the same properties as that of the original bitumen. The data shows that the skin is relatively thin and rigid.

Figure 8:
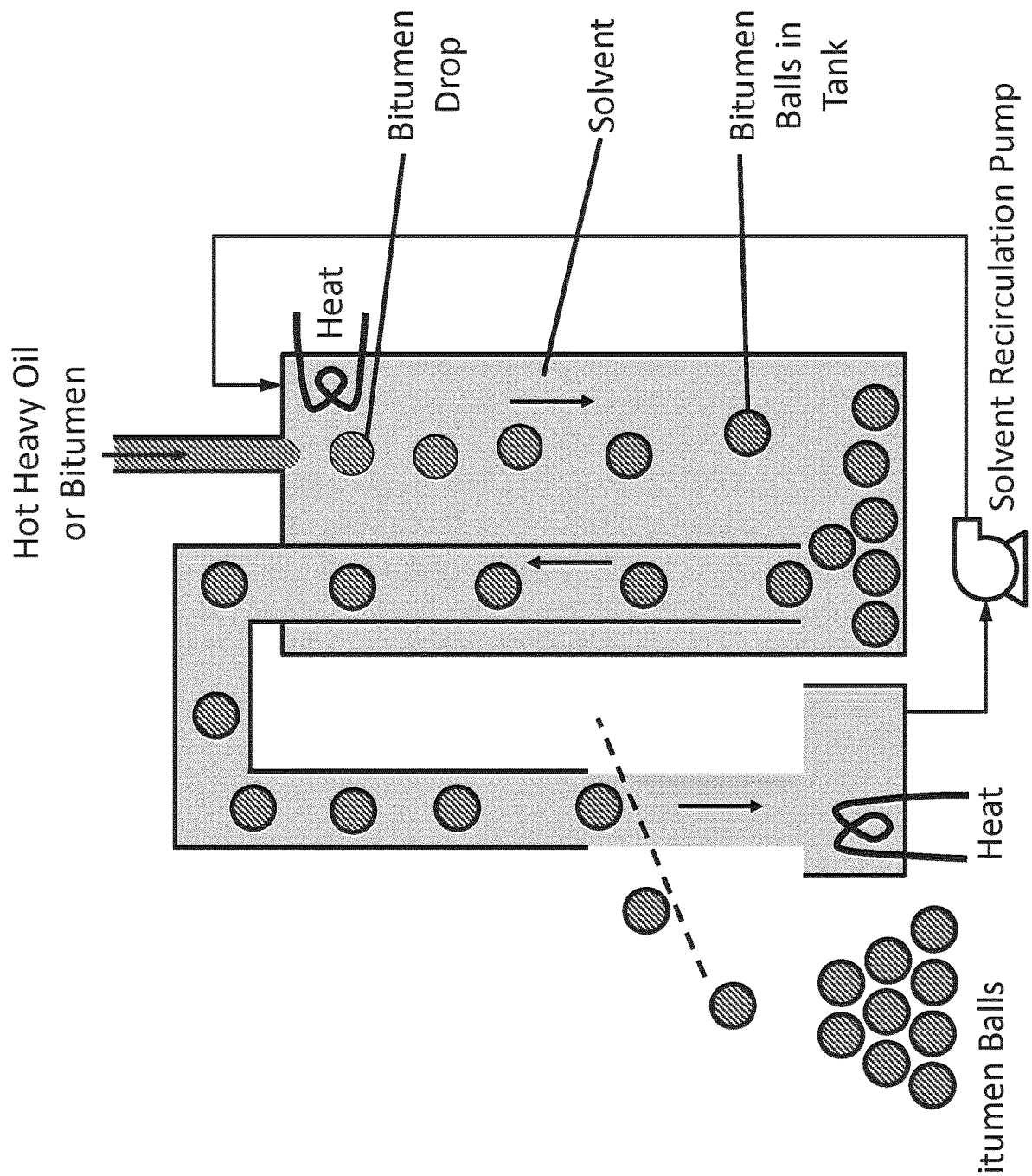
FIG. 8 is a diagram illustrating an alternative embodiment of the invention.

FIG. 8 illustrates a further alternative implementation of the methods of the invention, in which droplets of bitumen are formed in a solvent bath to form a asphaltenic skin on the outer surface. These methods may for example produce spherical or nearly spherical bitumen pellets.

Figure 9:
FIG. 9 includes two images illustrating a cylindrical bitumen pellet and draining of the encapsulated bitumen within the pellet.
Figure 9:

FIG. 9 shows an example of a bitumen pellet created by using one of the methods described herein. The first image of FIG. 9 displays a cylindrical bitumen pellet. The second image of FIG. 9 displays the bitumen draining from the pellet after it was opened and heated. The viscous bitumen drains from the pellet. The thickness of the skin is less than 1 mm.

In alternative implementations of the methods described herein, the bitumen pellets can be coated, for example with solid asphaltene or coke or polymers. This coating may for example be applied so as to reinforce the mechanical properties of the pellets.

In another implementation, during the formation of the skin on the pellet, light ends from the heavy oil or bitumen may be released and subsequently captured as a separate product stream. The methods of capture may for example involve containing the downstream side of the pelletization unit within an enclosure where the released vapour light ends are collected in a condenser or chilled condenser or collected on a cool surface and then directed into a collection system for further processing.

In a further step, the light ends may be recombined with the bitumen pellets to form a new heavy oil or bitumen mixture. This may for example be done by using methods to crush and mix liquids and solids such as a crusher or screw extruder or similar device.

Although various embodiments of the invention are disclosed herein, many adaptations and modifications may be made within the scope of the invention in accordance with the common general knowledge of those skilled in this art. Such modifications include the substitution of known equivalents for any aspect of the invention in order to achieve the same result in substantially the same way. Numeric ranges are inclusive of the numbers defining the range. The word "comprising" is used herein as an open-ended term, substantially equivalent to the phrase "including, but not limited to", and the word "comprises" has a corresponding meaning. As used herein, the singular forms "a", "an" and "the" include plural referents unless the context clearly dictates otherwise. Thus, for example, reference to "a thing" includes more than one such thing. Citation of references herein is not an admission that such references are prior art to the present invention. Any priority document(s) and all publications, including but not limited to patents and patent applications, cited in this specification are incorporated herein by reference as if each individual publication were specifically and individually indicated to be incorporated by reference herein and as though fully set forth herein. The invention includes all embodiments and variations substantially as hereinbefore described and with reference to the examples and drawings.

The invention claimed is:

1. A method of segregating a bituminous liquid into discrete shaped units, comprising:
    continuously dividing the bituminous liquid into shaped liquid aliquots, each aliquot having a discrete shape defined by a material handling mechanism that contains the aliquot; and
    heating the exterior of each shaped aliquot, the heating of the exterior causing an outer membrane of asphaltenic material to precipitate from the shaped bituminous liquid, the precipitated asphaltenic outer membrane forming a resilient asphaltenic coating encapsulating the shaped aliquot, the resilient asphaltenic coating retaining the discrete shape of the shaped aliquot when the aliquot is released from the material handling mechanism, to form a resiliently shaped unit of bituminous liquid encapsulated in the asphaltenic outer membrane.

2. The method of claim 1, wherein the initial density of the bituminous liquid is greater than 1 g/cm$^3$, and the density of the resiliently shaped unit of bituminous liquid is less than 1 g/cm$^3$.

3. The method of claim 1, wherein the material handling mechanism comprises a patterned roll having recesses therein that hold each shaped aliquot of bituminous liquid, wherein the patterned roll is heated so as to apply the heating to each aliquot and thereby causing the outer membrane of asphaltenic material to precipitate from the shaped bituminous liquid.

4. The method of claim 3, wherein the heated patterned roll is maintained at a temperature between about 300° C. and 500° C.

5. The method of claim 3, wherein the heated patterned roll is maintained at between about 350° C. and 450° C.

6. The method of claim 3, further comprising a heated backing roll that engages the patterned roll at a nib.

7. The method of claim 3, wherein the patterned roll deposits the resiliently shaped units of bituminous liquid on a oleophobic substrate.

8. The method of claim 7, wherein the resiliently shaped units of bituminous liquid are cooled on the oleophobic substrate.

9. The method of claim 1, further comprising exposing the exterior of each aliquot to an alkane solvent.

10. The method of claim 9, wherein the alkane solvent is propane, pentane or heptane.

11. The method of claim 1, further comprising exposing the exterior of each aliquot to ultrasound.

12. The method of claim 11, wherein the ultrasound is between about 20 and 40 kHz.

13. The method of claim 1, wherein the resilient asphaltenic coating is less than 2 mm thick.

14. The method of claim 1, wherein the bituminous liquid has an original viscosity of at least 1 million cP.

15. The method of claim 1, wherein the resilient asphaltenic coating has a Young's modulus of at least 0.1 GPa.

16. The method of claim 1, wherein the asphaltene content of the bituminous liquid is 15 to 20 weight percent.

17. The method of claim 1, wherein the asphaltene content of the resilient asphaltenic coating is 30-40 weight percent.

18. The method of claim 1, wherein during the process of heating, a light hydrocarbon fraction is released from the heavy oil or bitumen, and the light hydrocarbon fraction is collected.

19. The method of claim 1, wherein heating the exterior of each shaped aliquot further comprises generating and collecting a light hydrocarbon fraction of the bituminous liquid.

20. The method of claim 18, wherein a heavy oil product is recovered from the bituminous liquid encapsulated in the asphaltenic outer membrane by mixing the asphaltenic outer membrane with the encapsulated bituminous liquid, to provide a mixed hydrocarbon product, and wherein the light hydrocarbon fraction is recombined with this mixed hydrocarbon product to provide the heavy oil product.

21. The method of claim 20, further comprising grinding the mixed hydrocarbon product.

22. The method of claim 20, further comprising heating the mixed hydrocarbon product.

23. The method of claim 18, wherein a heavy oil product is recovered by removing the asphaltenic outer membrane from the bituminous liquid encapsulated in the asphaltenic outer membrane, and wherein the light hydrocarbon fraction is recombined with the heavy oil product.

* * * * *